United States Patent
Massot

(10) Patent No.: US 9,821,916 B2
(45) Date of Patent: Nov. 21, 2017

(54) METHOD AND A DEVICE FOR MANAGING A LOSS OF POWER ON A THREE-ENGINED POWER PLANT

(71) Applicant: AIRBUS HELICOPTERS, Marignane (FR)

(72) Inventor: Lucie Massot, Saint-Chamas (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 15/140,584

(22) Filed: Apr. 28, 2016

(65) Prior Publication Data

US 2016/0318617 A1    Nov. 3, 2016

(30) Foreign Application Priority Data

Apr. 29, 2015    (FR) ..................... 15 00907

(51) Int. Cl.

| | |
|---|---|
| B64D 27/00 | (2006.01) |
| B64D 25/00 | (2006.01) |
| B64D 45/00 | (2006.01) |
| B64D 35/08 | (2006.01) |
| F01D 21/00 | (2006.01) |
| F02C 9/42 | (2006.01) |
| F02C 9/46 | (2006.01) |
| B64D 31/12 | (2006.01) |

(52) U.S. Cl.
CPC ............. *B64D 27/00* (2013.01); *B64D 25/00* (2013.01); *B64D 31/12* (2013.01); *B64D 35/08* (2013.01); *B64D 45/00* (2013.01); *F01D 21/00* (2013.01); *F02C 9/42* (2013.01); *F02C 9/46* (2013.01); *B64D 2221/00* (2013.01)

(58) Field of Classification Search
CPC ........ B64D 27/00; B64D 25/00; B64D 31/12; B64D 35/08; B64D 45/00; B64D 2221/00; F01D 21/00; F02C 9/42; F02C 9/46
USPC ............................................................ 701/3
See application file for complete search history.

(56) References Cited

U.S. PATENT DOCUMENTS

| | | | |
|---|---|---|---|
| 3,963,372 A | 6/1976 | McLain et al. | |
| 3,969,890 A | 7/1976 | Nelson | |
| 8,666,568 B2 | 3/2014 | Camhi | |
| 2009/0186320 A1 | 7/2009 | Rucci et al. | |
| 2014/0302461 A1* | 10/2014 | Dumur .................... | G09B 9/46 434/33 |

(Continued)

FOREIGN PATENT DOCUMENTS

| | | |
|---|---|---|
| EP | 2623747 | 8/2013 |
| FR | 3008957 | 1/2015 |

OTHER PUBLICATIONS

French Search Report for French Application No. FR 1500907, Completed by the Fench Patent Office on Mar. 31, 2016, 8 Pages.

*Primary Examiner* — Jelani A Smith
*Assistant Examiner* — James E Stroud
(74) *Attorney, Agent, or Firm* — Brooks Kushman P.C.

(57) ABSTRACT

A method of managing a loss of power from a power plant having three engines. During a monitoring step, each engine is monitored in order to detect whether the engine is suffering a loss of power. During a verification step, it is determined whether the power plant is overpowered. During a signalling step, a first alert is generated when an engine has lost power but the power plant is in fact overpowered, and a second alert different from the first alert is generated when an engine has lost power and the power plant is not overpowered.

13 Claims, 1 Drawing Sheet

(56) References Cited

U.S. PATENT DOCUMENTS

| | | | | |
|---|---|---|---|---|
| 2015/0028153 A1* | 1/2015 | Rossotto | ................ | B64C 27/00 |
| | | | | 244/17.13 |
| 2016/0311547 A1* | 10/2016 | Rossotto | ................ | B64D 31/06 |
| 2016/0375994 A1* | 12/2016 | Rossotto | ................ | B64C 27/12 |
| | | | | 701/3 |
| 2016/0376017 A1* | 12/2016 | Rossotto | ................ | F02C 6/206 |
| | | | | 701/99 |
| 2017/0025032 A1* | 1/2017 | Dumar | ................ | G09B 9/46 |
| 2017/0028153 A1* | 2/2017 | Judson | ............. | A61M 16/0666 |

* cited by examiner

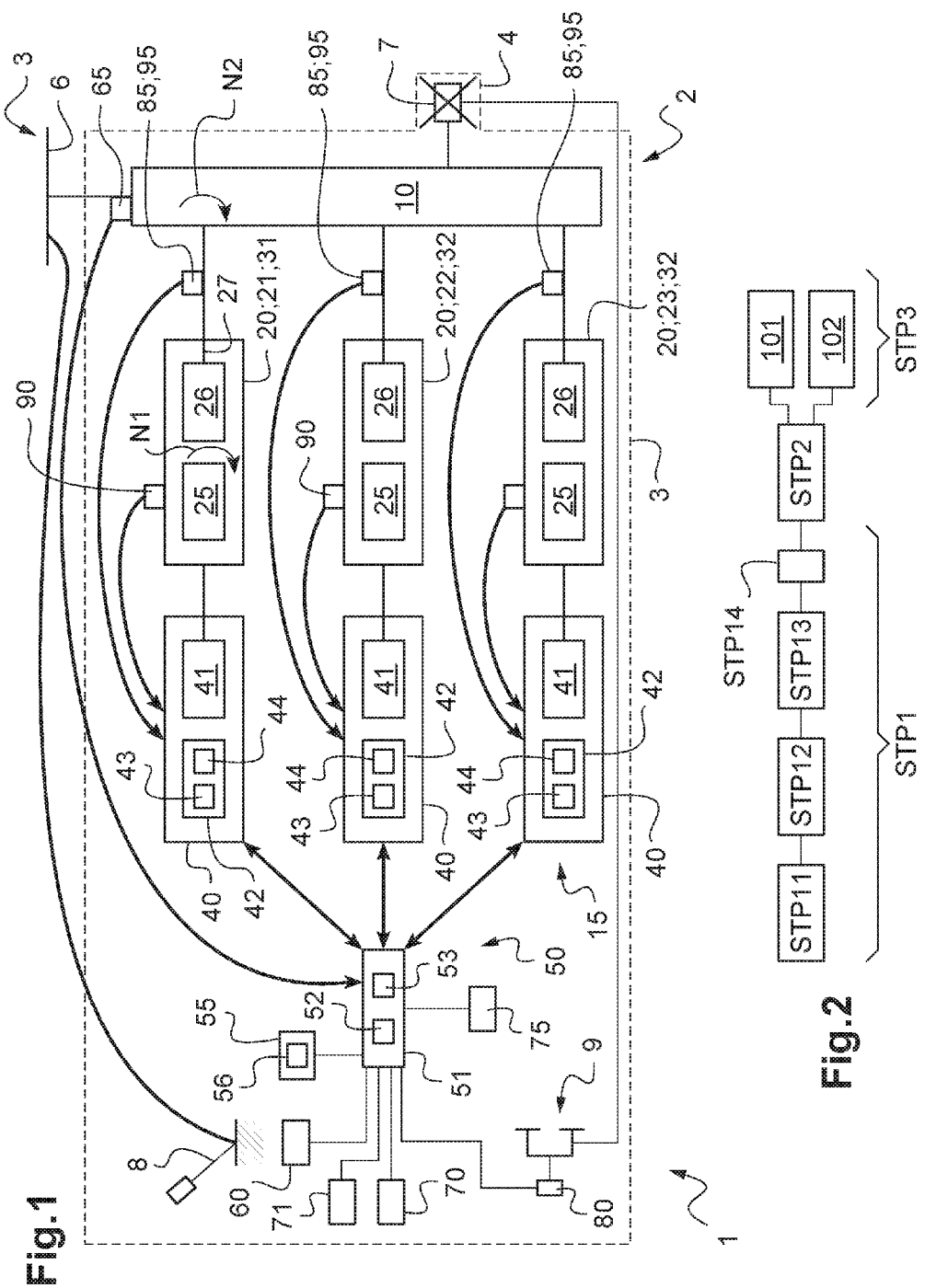

METHOD AND A DEVICE FOR MANAGING A LOSS OF POWER ON A THREE-ENGINED POWER PLANT

CROSS REFERENCE TO RELATED APPLICATION

This application claims priority to French patent application No. FR 15 00907 filed on Apr. 29, 2015, the disclosure of which is incorporated in its entirety by reference herein.

BACKGROUND OF THE INVENTION (1) Field of the Invention

The present invention relates to a method and to a device for managing a loss of power on a three-engined power plant.

The invention thus lies in the field of power plants, and more particularly the field of aircraft power plants.

(2) Description of Related Art

An aircraft, and in particular a rotorcraft, may have at least one rotor contributing to providing the aircraft with propulsion and/or lift.

In order to put each rotor into rotation, the aircraft thus has a power plant. The power plant may have at least two engines driving at least one main power transmission gearbox. The main gearbox then drives the rotor in rotation via a rotor mast.

At least one engine may be a fuel-burning engine. In particular, an engine may be a turboshaft engine.

Conventionally, a turboshaft engine comprises a gas generator having at least one compressor, a combustion chamber, and a high pressure expansion assembly connected to the compressor. The compressor may be provided with a plurality of axial and/or centrifugal compression stages.

Likewise, the expansion assembly may have at least one expansion turbine. In addition, the turboshaft engine has at least one low pressure turbine that is free or that is linked to the gas generator.

The operation of a turboshaft engine is controlled by a management system. For example, a known management system is a full authority digital engine control (FADEC). A management system usually comprises a computer connected to a fuel metering unit and to various members for measuring parameters. The fuel metering unit then enables the management system to control the rate at which fuel is transmitted to the engine.

Furthermore, a fuel-burning engine and in particular a turboshaft engine may operate at a plurality of ratings.

On a multi-engined aircraft, and in particular a twin-engined aircraft, such ratings include so-called "normal" ratings that are applied in the absence of any engine failure. Such ratings are referred to as all engines operative (AEO).

Conversely, turboshaft engine ratings include so-called "contingency" ratings for use in the event of an engine failure. These emergency or "contingency" ratings are referred to as one engine inoperative (OEI) ratings.

In addition, power management systems for a twin-engined aircraft monitor the powers being developed by the engines. For example, systems for monitoring two engines communicate with each other in order to detect a loss of power from an engine. Where applicable, an indication is given to the crew signalling that an "abnormal" loss of power has occurred. For example, a display may display "power loss" when a loss of power is detected.

Such a power loss is signaled to the crew insofar a loss of power may occur before an engine failure. A pilot can then be forewarned that there is a risk of needing to use an OEI rating.

Turboshaft engines are generally balanced so that they deliver the same power. If one engine begins to lose power, the other engine compensates by delivering more power. Consequently, and particularly on a twin-engined aircraft having two turboshaft engines, a loss of power is detected by evaluating a difference between the speeds of rotation of the two gas generators of the engines, or between the torque generated by the two engines. The speed of rotation of the gas generator and the torque developed by a turboshaft engine are both images of the power being delivered by the engine.

If a management system detects a difference that is greater than a threshold, a power loss alert is then generated. This alert is a "red" alert informing the crew that one of the engines is in the process of losing power. The pilot then uses engine parameters to determine which engine is failing.

That procedure is advantageous, but it can be difficult to transpose to a three-engined aircraft, which can sometimes be overpowered. A three-engined aircraft can present special features compared with a twin-engined aircraft. For example the power developed by the engines need not be uniform.

Documents FR 3 008 957, U.S. Pat. No. 3,963,372, U.S. Pat. No. 3,969,890, EP 2 623 747, and US 2009/186320 are also known.

BRIEF SUMMARY OF THE INVENTION

An object of the present invention is thus to propose a method and a device for managing a loss of power on a three-engined power plant.

The invention thus relates to a method of managing a loss of power from a power plant of an aircraft, the power plant having three engines, each engine being capable of developing a maximum power referred to as a "reference power" when none of the engines has failed.

The engines may be fuel-burning engines such as turboshaft engines and/or they may be electric motors. At least two engines can thus be different.

Each engine can then operate at a normal AEO rating. The maximum power of an engine then represents the highest power that can be developed by that engine when using normal ratings.

For example, a turboshaft engine may operate at a takeoff rating supplying a maximum takeoff power (TOP) and at a continuous rating supplying a maximum continuous power (MCP), or else at a transition rating. The reference power of the method is thus equal to the maximum takeoff power.

An electrical motor can also deliver a maximum power as used by the method.

In addition, at least one engine may operate at at least one OEI contingency rating when another engine has failed in order to develop contingency power that is greater than the reference power. By way of example, a turboshaft engine can operate at a first contingency rating over a short length of time to deliver a first contingency power known as OEI30", and a second contingency rating delivering a second contingency power for an intermediate length of time known as OEI2', or indeed a third emergency rating, continuously delivering a contingency power known as OEI-cont. Each contingency power is greater than the reference power.

The method comprises successive calculation iterations, the aircraft requesting a power referred to as "useful power" on each iteration, the method performing the following steps on each iteration:

a monitoring step for detecting a loss of power, during which each engine is monitored to detect whether an engine has suffered a loss of power, an engine that has not suffered a loss of power being referred to as an engine "in nominal operation", and an engine that has suffered a loss of power being referred to as an engine "in degraded operation";

a verification step for detecting overpower, during which each engine in nominal operation is monitored, the power plant being "overpowered" when the power developed jointly by the engines in nominal operation is sufficient to reach said useful power; and a signaling step for:

generating a first alert, in order to signal a degraded situation in which the power plant is capable of delivering said useful power on the basis of its reference powers, when an engine has suffered a loss of power and when the power plant is overpowered;

generating a second alert, so as to signal a degraded situation in which the power plant is not capable of delivering said useful power on the basis of its reference powers, when an engine has suffered a loss of power and when the power plant is not overpowered, the second alert being different from the first alert.

In this method, a management device of the aircraft determines whether an engine is suffering a loss of power, i.e. whether an engine is not supplying the requested power, at least outside stages of engine acceleration and deceleration. Such an engine is thus referred to for convenience as an engine "in degraded operation". Conversely, the engines that are operating correctly are referred to for convenience as engines "in nominal operation".

On a three-engined aircraft, and in particular a rotorcraft, the power plant may be overpowered during certain stages of flight. On a three-engined rotorcraft, the rotorcraft is overpowered for certain points of its authorized flight envelope, for example during level flight. The method enables this specific feature to be taken into consideration.

Under such circumstances, during the verification step, the management device considers whether the power plant is overpowered when an engine suffers a loss of power. When the power plant is overpowered, the engines in nominal operation suffice to achieve the useful power needed for flight while delivering normal AEO ratings, during the iteration in question or in the short term.

Consequently, the management device can evaluate whether the power plant is overpowered at the calculation iteration in question or whether the power plant is going to be overpowered in the short term.

Depending on the result of the verification step, the signalling step serves to display various different alerts.

The method makes it possible to organize power loss detection logic with two levels.

A first level consists in alerting the pilot that there is a power loss, but that it is of little consequence if the aircraft is overpowered in its flight situation.

Thus, when an engine loses power and the power plant is overpowered, the method makes provision for generating a first alert. This first alert may be visual, tactile, and/or audible.

By way of example, an aircraft conventionally has three types of alerts that are visually identified by a color code. An aircraft can thus generate minor alerts in a green color, intermediate alerts in an amber color, and critical alerts in a red color. Reference may be made to the literature to obtain further details about the color code used.

In this context, the first alert may be in the form of an alert of amber color. The advantage of this classification is that the pilot is alerted to the fact that the aircraft is operating in a degraded mode, while specifying that the degraded mode has limited impact on the fight. The aircraft is not in a critical situation since the power plant is still capable of delivering the useful power needed for the flight.

In contrast, a more critical second level alerts the pilot to the presence of a loss of power that is significant and that has real consequences on piloting the aircraft.

When an engine suffers a loss of power and when the power plant is not overpowered, the method makes provision for generating a second alert that is different from the first alert.

The second alert level is triggered when a loss of power from an engine makes it impossible to deliver the useful power needed for the flight while complying with normal AEO ratings.

This situation may arise, for example, as a result of an engine failing while the aircraft is climbing steeply, for which the reference power of all three engines is necessary.

In this context, the second alert may be in the form of an alert of red color. This signalling indicates that the situation is degraded and that the pilot must undertake urgent actions.

Consequently, the method presents the advantage of having alert levels that take overpower, if any, into consideration. The two alert levels thus make it possible to avoid alerting the pilot in untimely manner about a loss of power that does not have any significant consequence on piloting in the short term.

Such a method thus solves a problem in a manner that is innovative by applying logic that is novel.

The method may also include one or more of the following additional characteristics.

For example, the useful power may be determined by applying a predetermined relationship, the predetermined relationship delivering the useful power as a function of at least one of the following parameters: a collective pitch of the blades of a main rotor contributing at least to providing the aircraft with lift; a speed of rotation of said blades; a position of pedals controlling a secondary rotor contributing at least to controlling yaw movement of the aircraft, and the ambient environment around the aircraft with atmospheric pressure and atmospheric temperature.

The collective pitch may be the current collective pitch, i.e. the collective pitch during the calculation iteration in question, or it may be the collective pitch to be expected as a result of an order given during the calculation iteration in question. The method may take into consideration an order given by a conventional power anticipator.

The predetermined relationship may be prepared by performing flight tests and/or simulations, or indeed by performing aerodynamic studies.

On a rotorcraft having a main rotor and a secondary rotor, the useful power needed for driving the main rotor at a given speed may be calculated using all of the above-mentioned parameters, for example.

Furthermore, for the aircraft flying in a stage of flight referred to as a "current" stage of flight at each iteration, during the monitoring step, there are determined for each engine, both a power referred to as "current" power as developed by an engine and also a distribution coefficient, said distribution coefficient being determined as a function of the current stage of flight, an engine being considered as an engine in degraded operation when the current power is less than the product of at least one distribution coefficient of the engine multiplied by the useful power.

The useful power to be delivered is not necessarily uniformly distributed among the three engines of the power plant. The engines are regulated in such a manner that a power distribution coefficient is associated with each engine in order to obtain the following equations:

$$P1=\alpha*Put$$

$$P2=\beta*Put$$

$$P3=\gamma*Put$$

where "Put" is the useful power to be delivered, "P1" is the current power to be delivered by the first engine; "P2" is the current power to be delivered by the second engine, "P3" is the current power to be delivered by the third engine, "*" is the multiplication sign, "$\alpha$" is the distribution coefficient of the first engine, "$\beta$" is the distribution coefficient of the second engine, and "$\gamma$" is the distribution coefficient of the third engine.

In a first alternative, said current power of an engine is equal to the product of a torque developed by a drive shaft of the engine multiplied by a speed of rotation of said drive shaft.

Conventionally, an engine has a drive shaft driving members outside the engine. The speed of rotation of the drive shaft can be measured, or it can be evaluated using the speed of rotation of a rotor driven by the drive shaft, e.g. by taking account of the speed ratio between the rotor and the drive shaft.

Torque can be measured by a conventional torque meter arranged on the drive shaft.

In a second alternative, said current power of an engine is determined as a function of a speed of rotation of a gas generator, of ambient pressure, of ambient temperature, of aging of the engine, and of a production margin.

On a turboshaft engine, the power delivered by the engine at a given point in the flight envelope, i.e. at given atmospheric pressure and atmospheric temperature, can be evaluated as a function of the speed of rotation of the gas generator. A given speed of rotation of the gas generator corresponds to a given power, within the aging and production margins.

Aging margins can be evaluated by performing an engine "health" inspection.

Production margins are determined on a test bench during fabrication of the engine. A production margin represents the margin present between the real power developed by an engine and a theoretical power.

A database may contain information giving the current power as a function of atmospheric pressure, of atmospheric temperature, of the speed of rotation of the gas generator, of aging of the engine, and of a production margin of the engine.

In addition, each distribution coefficient is determined by testing, calculation, or simulation.

Each distribution coefficient also takes a value that varies as a function of the stage of flight.

Thus, a distribution coefficient may have different values during a stage of level flight, a stage of descending flight, a stage of climbing flight, a stage of turning flight, a stage of hovering flight, . . . . By way of example, the stage of flight may be evaluated as a function of the speed of advance of the aircraft.

This characteristic makes it possible to take into consideration a power distribution that need not be uniform and that might vary as a function of the stage of flight.

In a first variant, a loss of power is detected if the current power of an engine is less than the product of the distribution coefficient of that engine multiplied by the useful power.

At each instant, the management device needs to measure a current power equal to the product of the distribution coefficient of the engine multiplied by the useful power using the above equations.

If one of said equations is not satisfied, the management device deduces that there is a loss of power on the corresponding engine.

In a second variant, an engine is considered as being an engine in degraded operation when its current power is less than the product of the distribution coefficients of that engine multiplied by the useful power and by a "power" coefficient that is a function of said distribution coefficient.

A loss of power is detected when any one of the following relationships is satisfied:

$$P1<X*\alpha Put$$

$$P2<Y*\beta Put$$

$$P3<Z*\gamma Put$$

where "Put" is the useful power to be delivered, "P1" is the current power to be delivered by the first engine; "P2" is the current power to be delivered by the second engine, "P3" is the current power to be delivered by the third engine, "*" is the multiplication sign, "$\alpha$" is the distribution coefficient of the first engine, "$\beta$" is the distribution coefficient of the second engine, "$\gamma$" is the distribution coefficient of the third engine, "X" is the power coefficient of the first engine, "Y" is the power coefficient of the second engine, and "Z is the power coefficient of the third engine.

The power thresholds are adjusted by testing, simulation, or calculation as a function of the engines so as to find the best compromise between the following two requirements: the alert must be displayed soon enough to satisfy certification criteria and to enable the pilot to react if there is a problem; and the alert must not be untimely.

The use of power thresholds thus seeks to limit the number of untimely alerts, while enabling an alert to be generated relatively quickly, should that be necessary.

Furthermore, by way of example, each power coefficient is determined by applying an adjustment relationship that delivers said power coefficient as a function of a predetermined power margin and the product, for each engine, of the distribution coefficient associated with that engine multiplied by said useful power.

On an aircraft having three engines, the adjustment relationship for a given engine may have the following form:

$$X*\alpha*Put+\beta*Put+\gamma*Put=(1-K)*Put$$

where "*" represents the multiplication sign, "Put" represents said useful power, "$\alpha$" represents the distribution coefficient of the given engine, "$\beta$" represents the distribution coefficient of another engine, "$\gamma$" represents the distribution coefficient of another engine, "X" represents the power coefficient of the given engine, and "K" represents said predetermined power margin.

For example, if it is desired to detect an overall loss of power of 30%, the parameter K takes the value 0.30, thus leading to the following relationships for the three engines:

$$X*\alpha*Put+\beta*Put+\gamma*Put=0.70*Put$$

$$\alpha*Put+Y*\beta*Put+\gamma*Put=0.70*Put$$

$$\alpha*Put+\beta*Put+Z*\gamma*Put=0.70*Put$$

where "Put" is the useful power to be delivered, "P1" is the current power to be delivered by the first engine; "P2" is the current power to be delivered by the second engine, "P3" is the current power to be delivered by the third engine, "*" is the multiplication sign, "α" is the distribution coefficient of the first engine, "β" is the distribution coefficient of the second engine, "γ" is the distribution coefficient of the third engine, "X" is the power coefficient of the first engine, "Y" is the power coefficient of the second engine, and "Z is the power coefficient of the third engine.

Under such circumstances, in the method, the engine distribution coefficients are determined, and then the power thresholds for the engines are determined. Under such circumstances, a loss of power is evaluated on the basis of this information.

Furthermore, in an implementation, during said verification step, overpower is detected when a sum of the reference powers of the engines in nominal operation is greater than said useful power.

For a three-engined aircraft having a first engine that is suffering a loss of power, an overpower stage is detected if:

$$P\text{max}2 + P\text{max}3 > Put$$

where "Put" is the useful power to be delivered, "Pmax2" is the reference power for the second engine, "Pmax3" is the reference power for the third engine, and "+" is the addition sign.

In this situation, the method generates a first alert since the system for regulating the engine causes the required useful power to be delivered by requesting more power from the engines in nominal operation, but without that involving the use of an OEI contingency rating. No immediate action is then required of the pilot.

Otherwise, the method generates the second alert to indicate that the first engine runs the risk of failing and that it is going to be necessary to use the OEI contingency rating.

In a second implementation, during said verification step, overpower is not detected when the time derivative of the useful power is greater than a predetermined rate over a predetermined time interval.

The predetermined rate and the predetermined time interval may be determined by testing, calculation, and/or simulation, for example.

Instead of detecting an overpowered stage on the basis of the useful power at the current iteration, this second implementation envisages giving attention to how the demand for useful power has varied over the seconds or minutes that precede the loss of power, i.e. during said time interval.

For example, if said derivative is greater than the predetermined rate, the useful power requested has increased greatly during the predetermined time interval. In the method, it can be assumed that the demand for power will continue to increase and that the power plant will become underpowered in the short term.

In addition to a method, the invention also provides a management device for managing a loss of power on a three-engined power plant.

The management device is configured to apply the above-described method, said management device comprising a processor unit communicating with a signalling unit, said processor unit being configured to apply said method to generate said first alert or said second alert with the signalling unit.

Optionally, the processor unit communicates with at least one of the following measurement members: a member for measuring a collective pitch of blades of a main rotor contributing at least to providing the aircraft with lift; a member for measuring a speed of rotation of said blades relative to a rotor axis; a member for measuring a position of pedals controlling a secondary rotor contributing at least to controlling yaw movement of the aircraft; a member for the measuring atmospheric pressure; a member for measuring atmospheric temperature; a system for determining a stage of flight; a member for measuring torque developed by a drive shaft by each engine and a member for measuring a speed of rotation of the drive shaft, a member for measuring a speed of rotation of a gas generator for each engine; and a system for determining the aging of each engine.

The invention also provides an aircraft provided with a power plant, the power plant having three engines.

The aircraft then includes such a management device.

BRIEF DESCRIPTION OF THE SEVERAL VIEWS OF THE DRAWINGS

The invention and its advantages appear in greater detail from the following description of implementations given by way of illustration and with reference to the accompanying figures, in which:

FIG. 1 is a diagram showing an aircraft of the invention; and

FIG. 2 is a diagram showing the method of the invention.

Elements present in more than one of the figures are given the same references in each of them.

DETAILED DESCRIPTION OF THE INVENTION

FIG. 1 shows an aircraft 1 of the invention. This aircraft is provided with an airframe 2. A three-engined power plant 15 is received in the airframe 2.

In particular, the aircraft 1 may be a rotorcraft. Under such circumstances, the airframe 2 has a front portion 3 that carries at least one "main" rotor 5. Each main rotor 5 is provided with a plurality of blades 6 for contributing at least to providing the aircraft with lift and possibly also propulsion.

Under such circumstances, the aircraft may be provided with a member 8 for controlling the collective pitch of the blades of the main rotor, such as a "collective pitch" lever. The cyclic pitch of the blades 6 of the main rotor may be controlled by a "cyclic pitch stick" that is not shown. The collective pitch lever and the cyclic pitch stick control the pitch of the blades 6 of each main rotor via conventional members that are not shown and that are known to the person skilled in the art, such as servo-controls and a set of swashplates, for example.

The airframe may also have a rear portion 4 that carries a rotor referred to as the "secondary rotor 7", for convenience. The secondary rotor 7 may contribute to controlling the yaw movement of the aircraft.

Under such circumstances, the aircraft may for example have pedals 9 for controlling the collective pitch of the blades of the secondary rotor 7. The pedals control the pitch of the blades 6 of the secondary rotor 7 via conventional members that are not shown and that are known to the person skilled in the art, such as a servo-control, for example.

In order to drive at least one rotor in rotation, the aircraft 1 may also have at least one main power transmission gearbox 10 interposed between the rotor and the power plant 15.

The main gearbox 10 is driven by a power plant 15.

The power plant 15 has three engines 20. Thus, the power plant 15 has an engine 20 referred to as the "first engine 21", and engine 20 referred to as the "second engine 22", and an engine 20 referred to as the "third engine 23".

Each engine 20 has a drive shaft 27 suitable for driving at least one rotor, possibly via a power transmission gearbox 10. For example, each engine 20 drives a main gearbox 10 via a respective drive shaft 27, the main gearbox 10 then setting the main rotor 5 and the secondary rotor 7 into rotation.

Furthermore, the three engines may be identical, or they may be different. For example, two engines may develop the same theoretical power that is greater than the theoretical power that can be developed by the last engine.

At least one engine 20 may be a fuel-burning engine, such as a turboshaft engine, for example. By way of example, each engine 20 in the rotor of FIG. 1 is a turboshaft engine.

An engine 20 of turboshaft type is thus provided with a gas generator 25 arranged upstream from an expansion assembly 26 that drives the drive shaft 27 in rotation.

Each engine may also operate at at least one normal AEO rating. While applying their normal ratings, the first engine 21, the second engine 22, and the third engine 23 may then develop respective maximum reference powers Pmax1, Pmax2, and Pmax3.

Furthermore, at least one engine may operate in at least one OEI contingency rating when an engine has failed in order to develop emergency power that is greater than the reference power.

Conventionally, each engine 20 may be controlled by a management system 40, such as a system of the type known as a full authority digital engine control (FADEC). The term "management system" then refers to a system that controls the operation of an engine. The management systems of the various engines may communicate with one another.

Each management system 40 shown has a management computer referred to more simply as the "computer 42". By way of example, the computer may be of the type known as an engine control unit (ECU).

Under such circumstances, the computer may be provided with at least one processor 43 or the equivalent and with at least one memory unit 44. For example, and for safety purposes, the computer may have two distinct calculation channels that communicate with each other.

Furthermore, each management system 40 possesses a fuel metering unit 41. The fuel metering unit 41 controls the rate at which fuel is transmitted to the engine 20 under the control of the management system 40.

Under such circumstances, the processor 43 of the computer 42 executes instructions that are stored in the memory unit in order to set the fuel metering unit 41 in the appropriate position.

In order specifically to determine this appropriate position, each management system has a measurement system. The term "measurement system" is used to refer to a system that determines the values of parameters used for controlling an engine 20. These parameters include at least information about the operation of the aircraft, and in particular about the operation of the controlled engine.

Thus, the computer 42 can communicate with a measurement member 85 for measuring torque developed by a drive shaft 27 of the controlled engine 20. Such a measurement member 85 may comprise a conventional torque meter.

The computer 42 can also communicate with a measurement member 95 for measuring the speed of rotation N2 of the drive shaft 27, and a measurement member 90 for measuring a speed of rotation N1 of the gas generator 25 of the engine.

Furthermore, each management system may be used to monitor the health of an engine. Under such circumstances, each management system represents a system for determining the aging of an engine.

Furthermore, the aircraft has a management device 50 for managing a loss of power from an engine.

This failure management device 50 possibly includes each management system, and possibly at least one piece of equipment of the avionics system.

Under such circumstances, the management device 50 includes a processor unit 51.

Each computer may form part of the processor unit 51.

Nevertheless, and as shown in FIG. 1, the processor unit 51 may represent a unit of an avionics system communicating with each management system 40. Such a processor unit 51 may include a processor 52 or the equivalent, and a storage unit 53.

In addition, the management device includes a signalling unit 55 connected to the processor unit 51. By way of example, the signalling unit 55 may be provided with a display 56 suitable for displaying at least one alert and/or at least one means for audibly issuing an audible alert.

The signalling unit 55 and the processor unit 51 may form part of the same piece of avionics equipment.

Furthermore, the processor unit is connected to various measurement members.

For example, for each engine, the processor unit may be connected via the management system 40 of the engine to a measurement member 85 for measuring torque developed by a drive shaft 27 of the engine, a measurement member 95 for measuring a speed of rotation N2 of the drive shaft 27, a measurement member 90 for measuring a speed of rotation N1 of the gas generator 25 of the engine, and a system for determining the aging of the engine.

Furthermore, the processor unit may be connected to a measurement member 60 for measuring the collective pitch of the blades 6 of the main rotor 5. By way of example, this measurement member may measure the position of a rod connecting the collective pitch lever 8 to the main rotor 5.

Likewise, the processor unit may be connected to a measurement member 80 for measuring a position of the pedals 9.

Furthermore, the processor unit may be connected to a measurement unit 65 for measuring a speed of rotation of the main rotor.

In addition, the processor unit may be connected to a measurement member 70 for measuring atmospheric pressure and a measurement member 71 for measuring atmospheric temperature.

Finally, the processor unit may be connected to a system 75 for determining a stage of flight. Such a system may comprise an air data computer (ADC) for determining the speed of advance of the aircraft, or possibly an inertial unit for determining the attitude of the aircraft.

Stages of flight can be determined simply as follows:
- if the aircraft has a positive vertical speed, then it is a climbing stage;
- if the aircraft has a negative vertical speed, then it is a descending stage;

if the aircraft has zero vertical speed and zero speed of advance, then it is a hovering flight stage; and if the aircraft has zero vertical speed and a positive speed of advance, then it is a cruising stage.

The management device 50 then applies the method of the invention.

With reference to FIG. 2, the management device 50 performs a plurality of steps at each calculation iteration.

During a monitoring step STP1, the management device 50 monitors the power plant 15 in order to detect any potential loss of power of at least one engine.

Under such circumstances, the management device monitors each engine in order to detect whether an engine has suffered a loss of power.

By way of example, and as shown in FIG. 1, the management device 50 can determine that the second engine 22 and the third engine 23 are engines that have not suffered a loss of power. Such engines are said to be "engines 32 in nominal operation".

In contrast, the management device may consider that the first engine 21 is an engine that has suffered a loss of power. Such an engine is referred to for convenience as an "engine 31 in degraded operation".

In order to evaluate whether an engine has suffered a loss of power, the management device 50 can act during an evaluation step STP11 of the monitoring step STP1 to determine the useful power Put needed for flight in the current iteration.

This useful power Put may be determined by the management system by applying a predetermined relationship stored in its storage unit 53. Such a predetermined relationship provides the useful power as a function of at least one of the following parameters: a collective pitch of the blades 6 of the main rotor 5 contributing to providing the aircraft at least with lift; a speed of rotation of the blades 6; a position of the pedals 9 controlling the secondary rotor 7 and at least contributing to controlling the yaw movement of the aircraft 1; atmospheric pressure; and atmospheric temperature.

The predetermined relationship may be in the form of a mathematical equation, or indeed of a database, for example.

Under such circumstances, the management device interrogates the appropriate measurement members 60, 65, 80, 70 in order to obtain the value of each parameter used by the predetermined relationship, and it deduces the useful power therefrom.

During a step STP12 of evaluating a developed power and forming part of the monitoring step STP1, the management device determines the current power being developed by each engine at the time of the calculation iteration.

This current power may be calculated by each management system 40 and may be transmitted to the management device 50, or it may be calculated by the management device 50 on the basis of information transmitted by the management systems 40.

In a first alternative, the current power P1, P2, P3 of an engine 21, 22, 23 is equal to the product of a torque developed by a drive shaft 27 of that engine multiplied by a speed of rotation N2 of the drive shaft 27.

In a second alternative, the current power P1, P2, P3 of an engine 21, 22, 23 is determined as a function of a speed of rotation N1 of a gas generator 25, of engine aging, and of a production margin of the engine.

Furthermore, each engine may deliver a current power that is different from the power being delivered by another engine, where the sum of the current powers is being delivered by all three engines must be equal to the useful power Put.

During a step STP13 of evaluating power distribution and forming part of the monitoring step STP1, the management device determines distribution coefficients α, β, γ, the current power to be delivered by an engine then being equal to the product of the distribution coefficient multiplied by the useful power, in application of the following equations:

$$Put = P1 + P2 + P3$$

$$P1 = \alpha * Put$$

$$P2 = \beta * Put$$

$$P3 = \gamma * Put$$

where "Put" is the useful power to be delivered, "P1" is the current power to be delivered by the first engine; "P2" is the current power to be delivered by the second engine, "P3" is the current power to be delivered by the third engine, "*" is the multiplication sign, "α" is the distribution coefficient of the first engine, "β" is the distribution coefficient of the second engine, and "γ" is the distribution coefficient of the third engine.

The management device determines each distribution coefficient α, β, γ as a function of the current stage of flight.

For example, a relationship or a database supplies the distribution coefficients α, β, γ directly as a function of the current stage of flight, or indirectly as a function of parameters serving to qualify a stage of flight.

By way of illustration, a determination system 75 determines a current stage of flight as a function of the speed of advance and of the climb rate of the aircraft. The determination system 75 then transmits the current stage of flight to the management device 50, and the management device deduces therefrom the values of the distribution coefficients.

The determination system 75 may be a portion of the management device 50, e.g. being in the form of a segment of computer code.

Possibly, the management device 50 transmits the distribution coefficients to the management system 40 so that each engine delivers the required current power.

In another method, each management system 40 transmits to the management device 50 the value of the distribution coefficient for the engine under its control.

The evaluation step STP11, the step STP12 of evaluating a developed power, and the step STP13 of evaluating a power distribution may be performed one after another in the order described in FIG. 2, or in some other order, or indeed they may be performed simultaneously.

During a step STP14 of evaluating a loss of power and forming part of the monitoring step STP1, the management device determines whether an engine has suffered a loss of power.

The management device considers that an engine is an engine in degraded operation when its current power is less than the product of at least one distribution coefficient for that engine multiplied by the useful power.

In a first variant of the step STP14 of evaluating a power loss, an engine is an engine in degraded operation when its current power is less than the product of the distribution coefficient of that engine multiplied by the useful power.

In a second variant of the step STP14 of evaluating a power loss, the management device considers that an engine 21, 22, 23 is an engine in degraded operation when its current power is less than the product of the distribution coefficient α, β, γ of the engine 21, 22, 23 multiplied by the useful power Put and multiplied by a power coefficient X, Y, Z.

Under such circumstances, the management device determines each power coefficient X, Y, Z. Each power coefficient X, Y, Z is a function of the distribution coefficient α, β, γ of the corresponding engine and of the useful power Put.

By way of example, each power coefficient X, Y, Z is determined by the management device in application of a stored adjustment relationship supplying the power coefficient X, Y, Z as a function of a predetermined power margin K and of a product for each engine 21, 22, 23 of the distribution coefficient α, β, γ associated with that engine 21, 22, 23 multiplied by said useful power Put. The management device acts for each engine to apply an equation of the following type:

$$X*\alpha*\text{Put}+\beta*\text{Put}+\gamma*\text{Put}=(1-K)*\text{Put}$$

where "*" represents the multiplication sign, "Put" represents said useful power, "α" represents the distribution coefficient of the given engine, "β" represents the distribution coefficient of another engine, "γ" represents the distribution coefficient of another engine, "X" represents the power coefficient of the given engine, and "K" represents said predetermined power margin.

More precisely, the management device solves the following three equations:

$$X*\alpha*\text{Put}+\beta*\text{Put}+\gamma*\text{Put}=(1-K)*\text{Put}$$

$$\alpha*\text{Put}+Y*\beta*\text{Put}+\gamma*\text{Put}=(1-K)*\text{Put}$$

$$\alpha*\text{Put}+\beta*\text{Put}+Z*\gamma*\text{Put}=(1-K)*\text{Put}$$

where "Put" is the useful power to be delivered, "P1" is the current power to be delivered by the first engine; "P2" is the current power to be delivered by the second engine, "P3" is the current power to be delivered by the third engine, "*" is the multiplication sign, "α" is the distribution coefficient of the first engine, "β" is the distribution coefficient of the second engine, "γ" is the distribution coefficient of the third engine, "X" is the power coefficient of the first engine, "Y" is the power coefficient of the second engine, and "Z is the power coefficient of the third engine.

If an engine is suffering a power loss, then during an inspection step STP2, the management device determines whether the power plant is overpowered. The management device considers that the power plant is overpowered when the power developed jointly by the engines in nominal operation is sufficient to reach said useful power Put.

The power plant is thus overpowered if the engines in nominal operation are capable together of delivering the useful power, while making use solely of normal AEO ratings.

In a first implementation, the management device sums the reference powers for the engines 32 in nominal operation.

These reference powers may be transmitted by the management system, or indeed they may be stored in the memory of the management device.

If this sum is greater than the useful power Put, the power plant is overpowered.

For example, if the second engine and third engine are in operation, the management device determines whether the following relationship is satisfied:

$$P\text{max}2+P\text{max}3>\text{Put}$$

where "Pmax2" represents the reference power for the second engine, "Pmax3" represents the reference power for the third engine, and "Put" represents the useful power.

If this relationship is satisfied, the power plant is overpowered.

In a second implementation, the management device evaluates whether the value of a time derivative of the useful power Put is greater than a predetermined rate tx over a predetermined time interval. If the following condition is satisfied, the power plant is considered as being not overpowered:

$$d\text{Put}/dt>tx$$

where "dPut/dt" represents the time derivative of the useful power Put, and where "tx" represents the predetermined rate.

Finally, during a signalling step STP3, the management device operates the signalling unit 55 as a function of the situation.

The management device thus transmits a signal to the signalling unit 55 in order to generate a first alert 101 when an engine has lost power and the power plant is overpowered.

In contrast, the management device thus transmits a signal to the signalling unit 55 to generate a second alert 102 when an engine has lost power and when the power plant is not overpowered, the second alert being different from the first alert.

Naturally, the present invention may be subjected to numerous variations as to its implementation. Although several implementations are described, it can readily be understood that it is not conceivable to identify exhaustively all possible implementations. It is naturally possible to envisage replacing any of the means described by equivalent means without going beyond the ambit of the present invention.

What is claimed is:

1. A method of managing a loss of power from a power plant of an aircraft, the aircraft having a management device including a processor unit and a signaling unit, the power plant having three engines, each engine being capable of developing a maximum power (Pmax1, Pmax2, Pmax3) referred to as a "reference power" when none of the engines has failed, wherein the method comprises successive calculation iterations, the aircraft requesting a power referred to as "useful power (Put)" on each iteration, the method performing the following steps on each iteration:

a monitoring step (STP1) performed by the processor unit for detecting a loss of power, during which each engine is monitored to detect whether an engine has suffered a loss of power, an engine that has not suffered a loss of power being referred to as an engine "in nominal operation", and an engine that has suffered a loss of power being referred to as an engine "in degraded operation";

a verification step (STP2) performed by the processor unit for detecting overpower, the power plant being "overpowered" when the power developed jointly by the engines in nominal operation is sufficient to reach the useful power (Put); and a signaling step (STP3) performed by the processor unit and the signaling unit for:

generating a first alert by the processor unit when an engine has suffered a loss of power and when the power plant is overpowered, in order to signal by the signaling unit a degraded situation in which the power plant is capable of delivering the useful power (Put) on the basis of its reference powers; and generating a second alert by the processor unit when an engine has suffered a loss of power and when the power plant is not overpowered, so as to signal by the signaling unit a degraded situation in which the power plant is not capable of delivering the useful power (Put) on the basis of its reference powers, the second alert being different from the first alert.

2. The method according to claim 1, wherein the useful power (Put) is determined by applying a predetermined relationship, the predetermined relationship delivering the useful power as a function of at least one of the following parameters: a collective pitch of blades of a main rotor contributing at least to providing the aircraft with lift; a speed of rotation of the blades; a position of pedals controlling a secondary rotor contributing at least to controlling yaw movement of the aircraft; an atmospheric pressure; and an atmospheric temperature.

3. The method according to claim 1, wherein, for the aircraft flying in a stage of flight referred to as a "current" stage of flight at each iteration, during the monitoring step, there are determined for each engine both a power referred to as "current" power (P1, P2, P3) as developed by an engine and also a distribution coefficient ($\alpha$, $\beta$, $\gamma$), the distribution coefficient ($\alpha$, $\beta$, $\gamma$) being determined as a function of the current stage of flight, an engine being considered as an engine in degraded operation when its current power (P1, P2, P3) is less than the product of at least one distribution coefficient of the engine multiplied by the useful power (Put).

4. The method according to claim 3, wherein the current power (P1, P2, P3) of an engine is equal to a product of a torque developed by a drive shaft of the engine multiplied by a speed of rotation of the drive shaft.

5. The method according to claim 3, wherein the current power (P1, P2, P3) of an engine is determined as a function of a speed of rotation of a gas generator, of aging of the engine, and of a production margin.

6. The method according to claim 3, wherein an engine is considered as being an engine in degraded operation when its current power (P1, P2, P3) is less than the product of the distribution coefficients ($\alpha$, $\beta$, $\gamma$) of that engine multiplied by the useful power (Put) and by a power coefficient (X, Y, Z) that is a function of the distribution coefficient ($\alpha$, $\beta$, $\gamma$).

7. The method according to claim 6, wherein each power coefficient (X, Y, Z) is determined by applying an adjustment relationship that delivers the power coefficient (X, Y, Z) as a function of a predetermined power margin (K) and the product, for each engine, of the distribution coefficient ($\alpha$, $\beta$, $\gamma$) associated with that engine multiplied by the useful power (Put).

8. The method according to claim 7, wherein on an aircraft having three engines, the adjustment relationship for a given engine is of the following form:

$$X*\alpha*\text{Put}+\beta*\text{Put}+\gamma*\text{Put}=(1-K)*\text{Put}$$

where "*" represents the multiplication sign, "Put" represents the useful power, "$\alpha$" represents the distribution coefficient of the given engine, "$\beta$" represents the distribution coefficient of another engine, "$\gamma$" represents the distribution coefficient of another engine, "X" represents the power coefficient of the given engine, and "K" represents the predetermined power margin.

9. The method according to claim 1, wherein, during the verification step (STP2), overpower is detected when a sum of the reference powers (Pmax1, Pmax2, Pmax3) of the engines in nominal operation is greater than the useful power (Put).

10. The method according to claim 1, wherein during the verification step (STP2), overpower is not detected when a time derivative of the useful power (Put) is greater than a predetermined rate (tx) over a predetermined time interval.

11. A management device for managing a loss of power on a three-engined power plant of an aircraft, each engine being capable of developing a maximum power (Pmax1, Pmax2, Pmax3) referred to as a "reference power" when none of the engines has failed, the aircraft requesting a power referred to as "useful power (Put)" on each of successive iterations, the management device comprising:
   a processor unit;
   a signaling unit; and
   wherein the processor unit is configured to, on each iteration,
      detect whether an engine has suffered a loss of power, an engine that has not suffered a loss of power being referred to as an engine "in nominal operation", and an engine that has suffered a loss of power being referred to as an engine "in degraded operation";
      detect whether the power plant is overpowered, the power plant being "overpowered" when the power developed jointly by the engines in nominal operation is sufficient to reach the useful power (Put);
      generate a first alert when an engine has suffered a loss of power and when the power plant is overpowered, in order to signal by the signaling unit a degraded situation in which the power plant is capable of delivering the useful power (Put) on the basis of its reference powers; and
      generate a second alert when an engine has suffered a loss of power and when the power plant is not overpowered, so as to signal by the signaling unit a degraded situation in which the power plant is not capable of delivering the useful power (Put) on the basis of its reference powers, the second alert being different from the first alert.

12. The management device according to claim 11, wherein the processor unit communicates with at least one of the following measurement members:
   a member for measuring a collective pitch of blades of a main rotor contributing at least to providing the aircraft with lift;
   a member for measuring a speed of rotation of the blades;
   a member for measuring a position of pedals controlling a secondary rotor contributing at least to controlling yaw movement of the aircraft;
   a member for measuring atmospheric pressure;
   a member for measuring atmospheric temperature;
   a system for determining a stage of flight;
   a member for measuring torque developed by a drive shaft by each engine and
   a member for measuring a speed of rotation (N2) of the drive shaft, a member for measuring a speed of rotation (N1) of a gas generator of an engine; and
   a system for determining aging of each engine.

13. An aircraft comprising:
   a power plant having three engines, each engine being capable of developing a maximum power (Pmax1, Pmax2, Pmax3) referred to as a "reference power" when none of the engines has failed;
   wherein the power plant is to provide a requested power referred to as "useful power (Put)" on each of successive iterations;
   a management device for managing a loss of power on the power plant, the management device including a processor unit and a signaling unit; and wherein the processor unit is configured to, on each iteration,
- detect whether an engine has suffered a loss of power, an engine that has not suffered a loss of power being referred to as an engine "in nominal operation", and an engine that has suffered a loss of power being referred to as an engine "in degraded operation";
- detect whether the power plant is overpowered, the power plant being "overpowered" when the power developed jointly by the engines in nominal operation is sufficient to reach the useful power (Put);
- generate a first alert when an engine has suffered a loss of power and when the power plant is overpowered, in order to signal by the signaling unit a degraded situation in which the power plant is capable of delivering the useful power (Put) on the basis of its reference powers; and
- generate a second alert when an engine has suffered a loss of power and when the power plant is not overpowered, so as to signal by the signaling unit a degraded situation in which the power plant is not capable of delivering the useful power (Put) on the basis of its reference powers, the second alert being different from the first alert.

* * * * *